US005755470A

United States Patent [19]

Schempp

[11] Patent Number: 5,755,470

[45] Date of Patent: May 26, 1998

[54] FIRE HOSE MANIPULATOR

[76] Inventor: William Schempp, 864 Thompson Ave., Donora, Pa. 15033

[21] Appl. No.: 612,486

[22] Filed: Mar. 7, 1996

[51] Int. Cl.[6] ....... B65G 7/00

[52] U.S. Cl. ....... 294/17; 254/119; 254/131

[58] Field of Search ....... 294/1.1, 4, 11, 294/15–17, 59; 254/15, 30, 44, 113, 119–121, 129, 131, 131.5

[56] References Cited

U.S. PATENT DOCUMENTS

| | | | |
|---|---|---|---|
| 15,628 | 8/1856 | Woolson | 254/131.5 |
| 297,788 | 4/1884 | Green | 294/16 |
| 303,492 | 8/1884 | Crow | 254/44 |
| 666,474 | 1/1901 | De Wolfe | 294/16 |
| 1,219,948 | 3/1917 | Kaehler | 254/131 |
| 2,599,938 | 6/1952 | Price et al. | 294/15 |
| 2,872,888 | 2/1959 | Kearney | 294/4 X |
| 3,124,383 | 3/1964 | Cahan | 294/11 |
| 3,779,515 | 12/1973 | Larios et al. | 254/119 X |
| 4,493,477 | 1/1985 | Greer | 254/113 X |
| 5,505,433 | 4/1996 | Carmichael | 254/119 X |

FOREIGN PATENT DOCUMENTS

| | | | |
|---|---|---|---|
| 808505 | 7/1951 | Germany | 294/59 |
| 2207384 | 2/1989 | United Kingdom | 294/16 |

*Primary Examiner*—Johnny D. Cherry
*Attorney, Agent, or Firm*—William L. Krayer

[57] ABSTRACT

A fire hose manipulator comprises an elongated lever rod, a hose contacting element, and an adjustable pivot for connecting the hose contacting element to the lever rod.

8 Claims, 3 Drawing Sheets

FIRE HOSE MANIPULATOR

TECHNICAL FIELD

This invention relates to the field of fire fighting, and particularly to the problem of moving or manipulating large hoses. The invention is a device which enables a single firefighter to move a large working hose, of the order of five inches in diameter.

BACKGROUND OF THE INVENTION

In the past several years, there has been a trend toward the use of larger hoses in firefighting, particularly in supply hoses, i.e. hose which connects a primary source such as a hydrant to a pump truck. The larger diameter hoses not only deliver more water than smaller hoses but can do so inherently more efficiently because there is less loss of energy due to turbulence for a given quantity of water delivered.

A difficulty presented by the larger diameter hoses, however, is that they are heavier and more difficult to move than their smaller counterparts. Frequently, hoses must be moved to make way for more equipment, to relocate equipment, to change pumper trucks, or for various other reasons. Whether or not water is actually flowing through the hose, it can be quite difficult, and, perhaps more important, time-consuming, for a single firefighter, or even for several firefighters, to reposition manually.

FIGS. *3a* and *3b* show the invention in use.

DETAILED DESCRIPTION OF THE INVENTION

Figure 1:
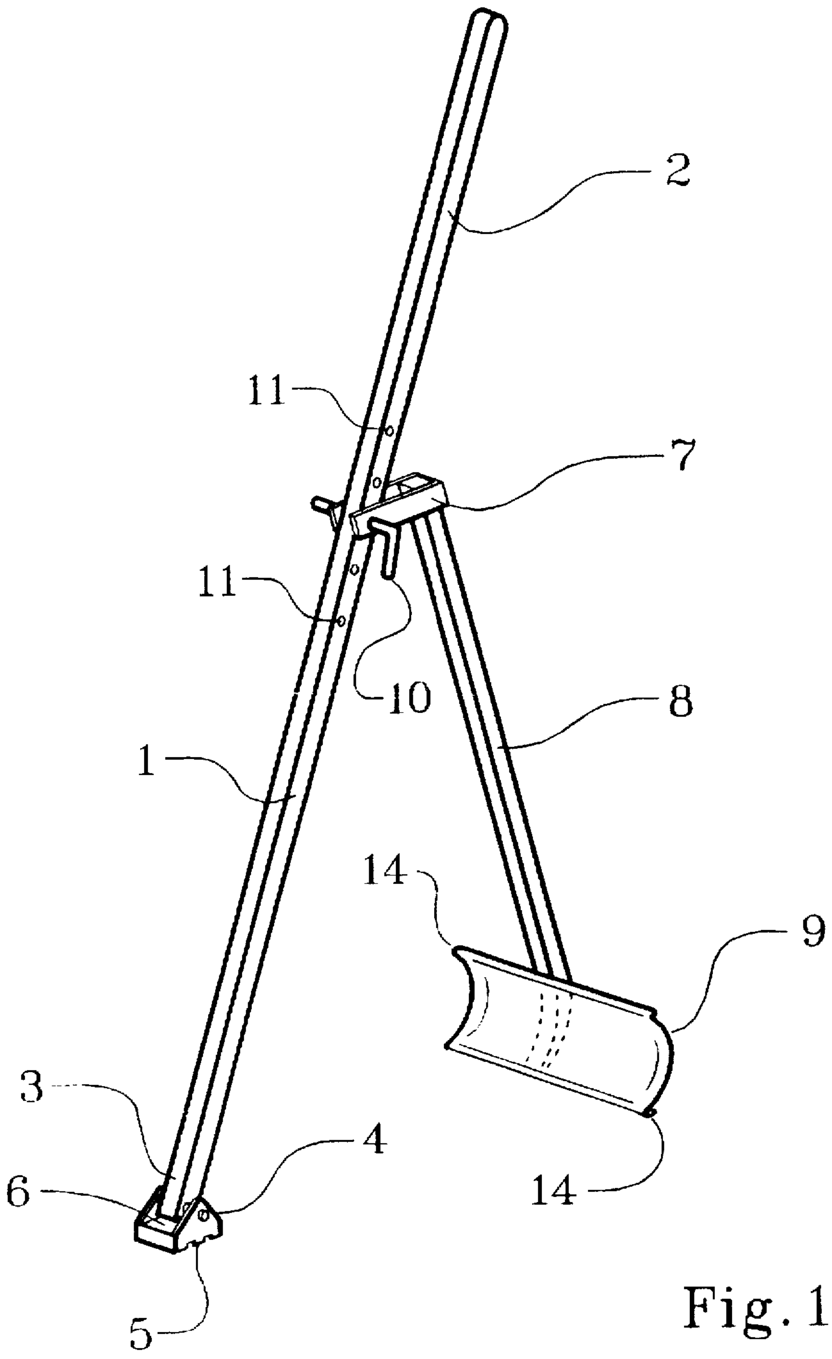
FIG. 1 is a side elevational view of my hose manipulator in the open position.

Referring now to the drawings, in FIG. 1, an elongated lever rod 1 is shown to have a handle portion 2 and a foot portion 3 terminating in a pivot base 4. The pivot base 4 has serrations 5 on its bottom surface designed to provide friction against the pavement or other supporting surface, such as the conventional ladder rest used in this instance for pivot base 4. The ladder rest used for pivot base 4 provides a socket area 6 which is large enough to permit the foot portion 3 of elongated lever rod 1 to swivel in it.

Clevis 7 is welded or otherwise fixed to the upper end of connecting rod 8, to the lower end of which is fixed scoop 9. A removable pin 10 passes through clevis 7 and through one of the sets of holes 11 in elongated lever rod 1, providing the scoop 9 with a jointed or articulated means for movement relative to the elongated lever rod 1 and particularly relative to the placement of foot 4. Any suitable hinge or other articulating means will be satisfactory which permits movement of scoop 9 relative to foot 4, but I prefer the device shown because pin 10 is easily removed for adjustment of the height of clevis 7 on elongated rod 1 by inserting it through any of several sets of holes 11. The holes 11 are most efficiently deployed near the center of elongated lever rod 1 but may be placed any distance from the handle portion 2 and the foot portion 3 which is convenient for the user.

Figure 2:
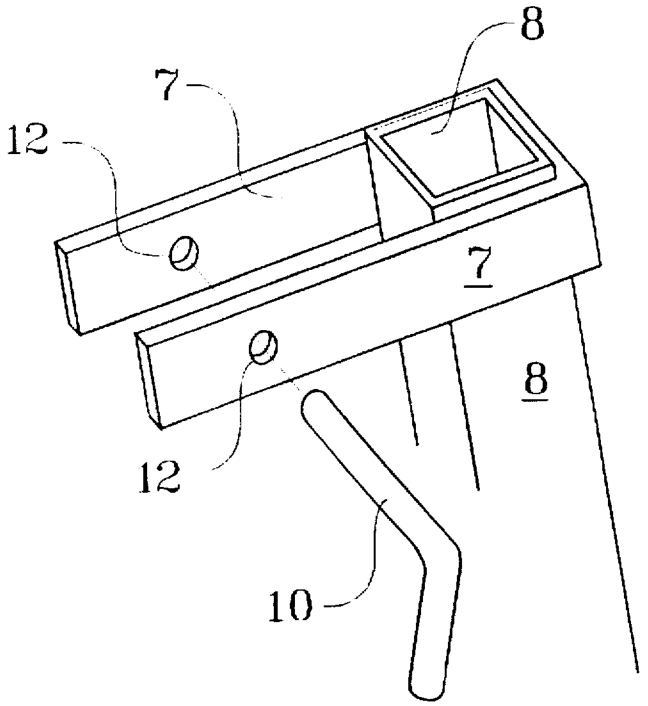
FIG. 2 is an expanded perspective of the adjustable joint for the invention.
Figure 3A:
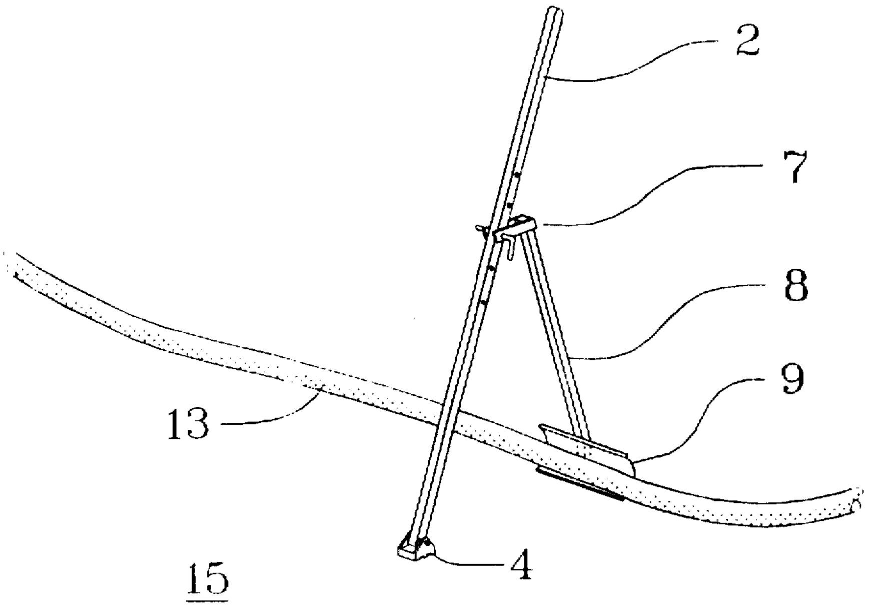
Figure 3B:
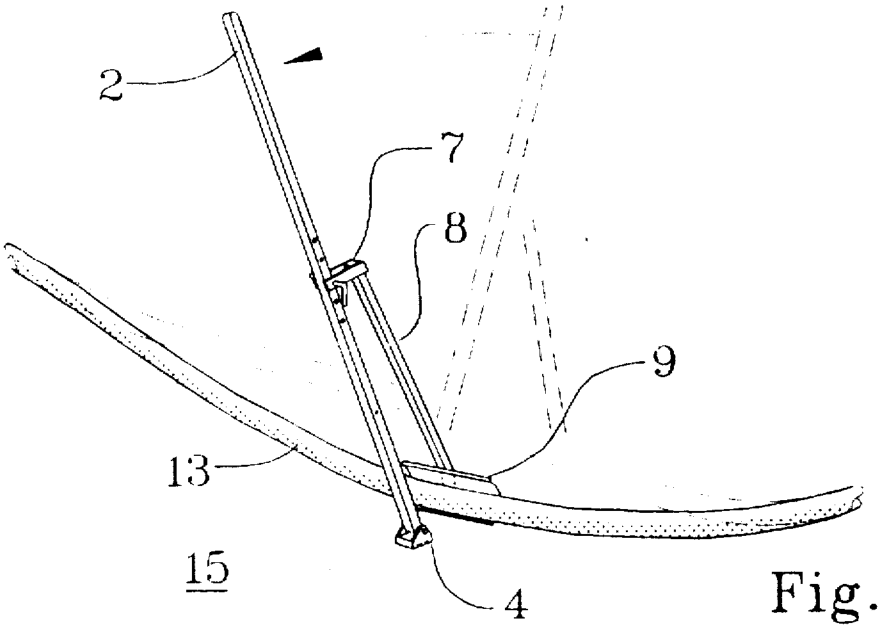

Clevis 7 is shown in FIG. 2 to be welded or otherwise affixed to connecting rod 8. The holes 12 through which pin 10 is inserted are aligned with the preferred set of holes 11 in the elongated lever rod 1.

In FIG. *3a*, a supply hose 13 to be moved is shown on a pavement surface 15. The foot 4 is placed on the side of hose 13 toward which the hose 13 is to be moved, and scoop 9 is placed on the other side. The operator connects clevis 7 to elongated rod 1 as explained above with respect to FIGS. 1 and 2 and applies force to the handle portion 2 in the direction of the arrow to move the hose 13, resulting in movement of hose 13 as illustrated in FIG. *3b*.

In the preferred embodiment illustrated, the four corners 14 of the scoop are slightly flared back, that is, in a direction away from the concave surface of the scoop 9. Scoop 9 has been illustrated in a preferred shape, but numerous other shapes, embodiments and configurations may be used for the hose-engaging member, such as tines, plates, bent tubing, and convex or concave pushing surfaces. I prefer shapes having a scoop-like lower portion or edge so that the main point for the application of force is below the midpoint of the hose, such as the generally semi-cylindrical shape illustrated by scoop 9. This will provide a slight lifting effect and minimize the tendency of the hose to roll. I also prefer that the scoop be free of sharp edges and corners; in FIG. 1, this is illustrated by the preferred flaring back of the corners of scoop 9. The flaring configuration may be amplified so that, for example, the overall appearance of the scoop is not a partial cylindrical shape, but a convex surface for application to the hose, generally linear at the base and with wide backward flares toward the upper corners.

Any friction-enhancing means may be used in place of serrations 5 on foot 4. Foot 4 may be considered broadly a lever-implanting member, which enables the firm placement of the elongated lever rod on the supporting surface. My invention does not require the use of the illustrated preferred pivot base 4; any construction which will permit angular movement of foot 3 will suffice.

I claim:

1. Apparatus for moving fire hose comprising (a) an elongated lever rod having a handle portion and terminating in a foot portion, said foot portion being pivoted to permit angular movement of said elongated lever rod in said foot portion, (b) a scoop having a hose-contacting surface, (c) a connecting rod attached to said scoop, and (d) articulating means connecting said connecting rod to said elongated lever rod so that said hose-contacting surface of said scoop is oriented toward said elongated lever rod.

2. Apparatus of claim 1 wherein said scoop has a generally semi-cylindrical shape.

3. Apparatus of claim 2 wherein said scoop has corners flared in a direction away from said elongated lever rod.

4. Apparatus of claim 1 wherein said scoop has corners which are flared in a direction away from said elongated lever rod.

5. Apparatus of claim 1 wherein said articulating means is a clevis.

6. Apparatus of claim 1 wherein the position of said articulating means on said elongated lever rod is adjustable.

7. Apparatus of claim 1 wherein said foot portion of said elongated lever rod includes means for enhancing friction on a supporting surface.

8. Apparatus for moving fire hose comprising a hose-engaging member, a lever, a lever-implanting member for placing said lever on a supporting surface, said lever-implanting member being pivoted to permit angular movement of said lever therein, and articulating means connecting said hose-engaging member and said lever to orient said hose-engaging member toward said lever-implanting member.

* * * * *